I. L. PLUMER.
TRUNKS.
No. 7,011.
Reissued March 21, 1876.
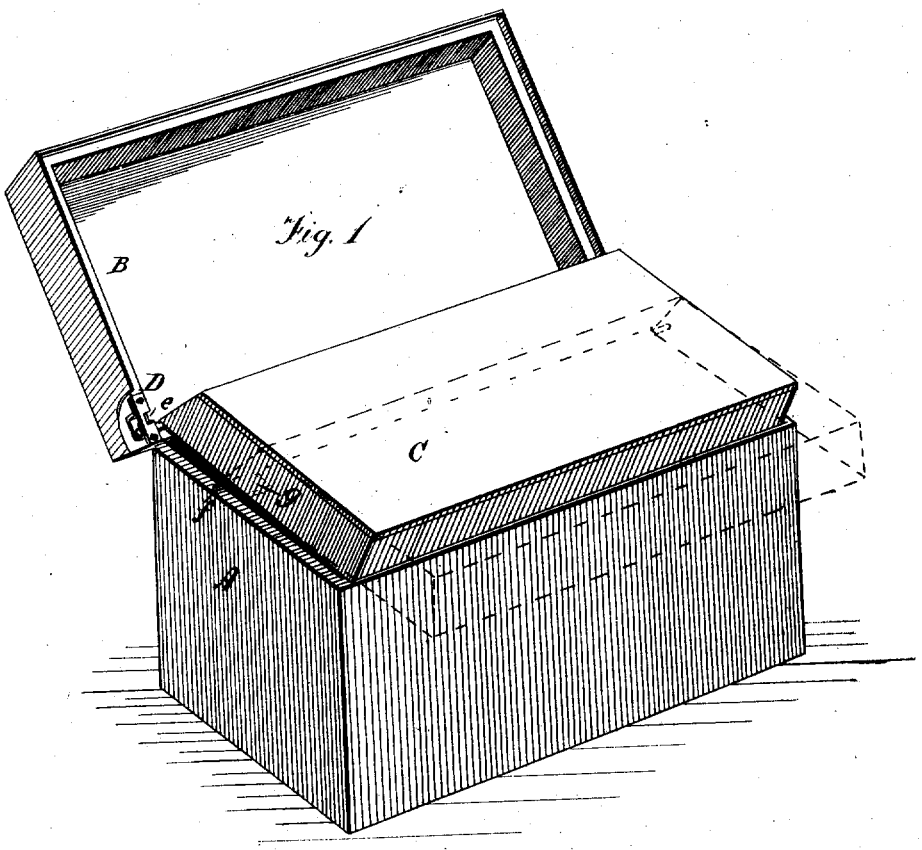
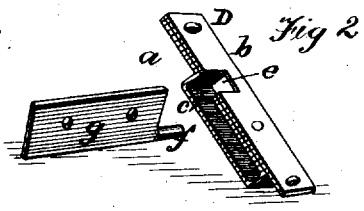
Witnesses;
Grenville Lewis
F. McKenny
Anthony O. Romadka Engineer
Isaac L. Plummer
Inventor.
by Stanbury & Blount
his attys.

UNITED STATES PATENT OFFICE.

ISAAC L. PLUMER, OF CHELSEA, MASSACHUSETTS, ASSIGNOR, BY MESNE ASSIGNMENTS, TO ANTHONY V. ROMADKA, OF MILWAUKEE, WISCONSIN.

IMPROVEMENT IN TRUNKS.

Specification forming part of Letters Patent No. 52,074, dated January 16, 1866; reissue No. 7,011, dated March 21, 1876; application filed March 13, 1876.

*To all whom it may concern:*

Be it known that ISAAC L. PLUMER, of Chelsea, Massachusetts, did invent certain Improvements in Trunks, of which the following is a full and clear description, reference being had to the accompanying drawings, in which—

Figure 1 is a perspective view of an open trunk, showing a compartment-tray removably hinged therein; and Fig. 2 is a perspective view of the mechanical devices detached.

Heretofore trunks have been made with separate interior compartments, arranged to set therein loosely without any connections, or else to be permanently hinged. In the ordinary construction the upper compartment in the top of the trunk is the one usually permanently hinged, while the lower one, in the body, sets in loose. Both plans have their advantages and their objections. While the lower compartment has to be moved for the purpose of gaining access to the space beneath it, the upper has only to be turned down to get at the space behind it. Yet, for convenience in packing, a loose compartment has some advantages which a permanently-hinged one does not have.

It has been found, too, that an upper permanently-hinged compartment is liable to fall down and be in the way, and also to break away from the trunk at the joint, especially when the joint is made of cloth, leather, or like material, as is usually the case.

The object of this invention is to overcome these objections, and at the same time secure for the trunk all the advantages of having its compartments hinged and removable. This is accomplished by hinging them removably by means of certain mechanical contrivances suitable for that purpose.

In the drawings, A represents the body of a trunk, to which the upper part B is hinged in the usual manner. C is a compartment fitting into the top B, made removably hinged in the following manner: In the lower edges of the sides of the top B socket-bearings D are inserted and fastened, as clearly shown in Fig. 1. These socket-bearings are made of two pieces, *a* and *b*, of sheet metal, shaped and secured to each other as clearly shown in Fig. 2, the lower one, *a*, being bent so as to form a slot, *c*, while the upper one, *b*, is provided with a notch, *e*, opening into the slot *c*, as shown in the same figure. To the sides of the compartment C, and at the points thereon, when in position, corresponding with the position of the socket-bearings D when in place, metallic pins *f*, formed on the ends of metal plates *g*, as shown in Fig. 2, are fastened by means of the plates, as shown in Fig. 1. With these mechanical devices, thus made and applied, in order to hinge the compartment C it is only necessary to let the pins *f* into the sockets *c* through the notches *e*. It can then be swung up and fastened. When desired to get access to its interior, or to the space in the trunk behind it, it can be let down, as shown in Fig. 1; or it may be entirely removed for convenience in packing, or for any other purpose, as shown in the same figure in dotted lines.

Having thus described the invention, what is claimed is—

1. A trunk provided with a removably-hinged compartment-tray.

2. In a trunk, and in combination therewith, a compartment-tray removably hinged by means of socket-bearings D, attached to the trunk and pins *f*, attached to the compartment-tray, substantially as herein described, and for the purpose set forth.

The above specification signed and witnessed at Milwaukee this 10th day of February, 1876.

ANTHONY V. ROMADKA,
*Assignee by mesne assignments.*

Witnesses:
D. C. MILLETT,
JAMES ALLAN.